S. BARBER.
COFFEE MAKING URN.
APPLICATION FILED NOV. 17, 1916.
1,254,301.
Patented Jan. 22, 1918.
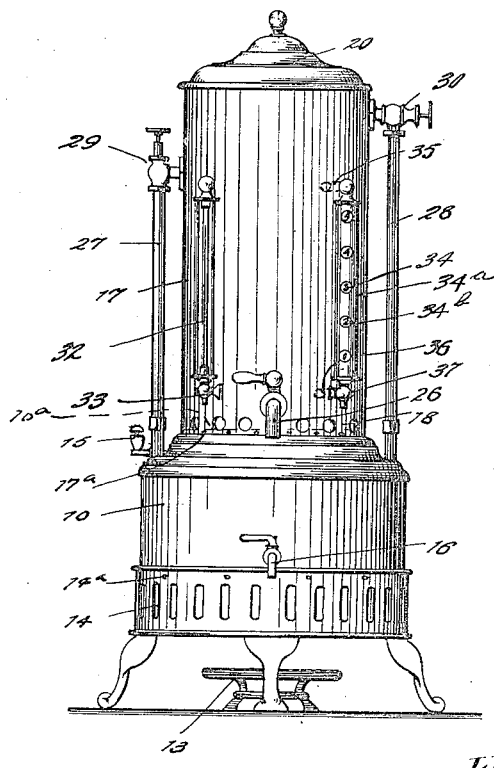
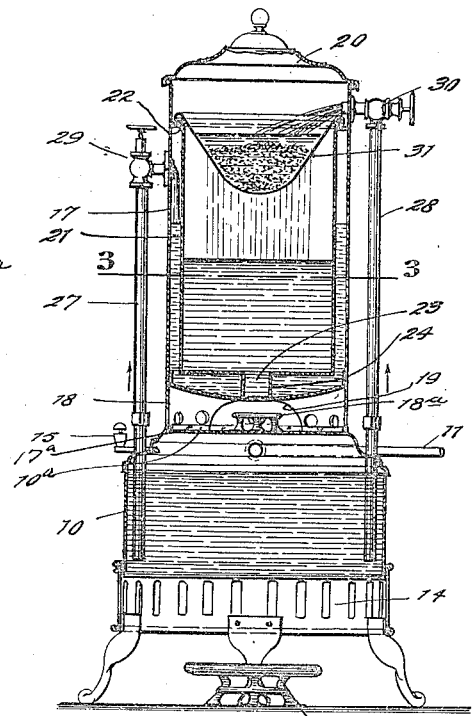
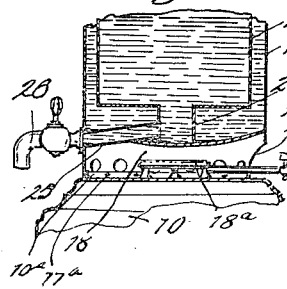
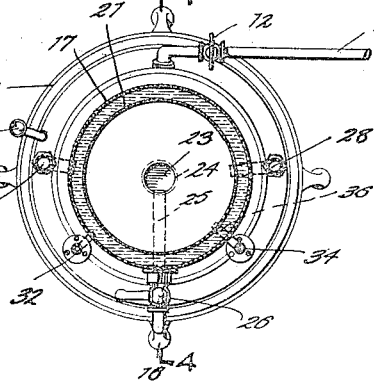
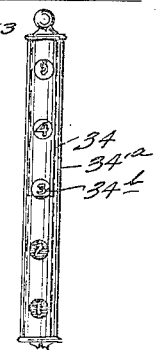
INVENTOR
Solomon Barber
BY
ATTORNEY

UNITED STATES PATENT OFFICE.

SOLOMON BARBER, OF NEW YORK, N. Y.

COFFEE-MAKING URN.

1,254,301. Specification of Letters Patent. Patented Jan. 22, 1918.

Application filed November 17, 1916. Serial No. 131,811.

*To all whom it may concern:*

Be it known that I, SOLOMON BARBER, a subject of the King of Roumania, and resident of New York, in the borough of Manhattan, city and State of New York, have invented certain new and useful Improvements in Coffee-Making Urns, of which the following is a specification.

The present invention relates to improvements in coffee making urns, and particularly such urns as are used in restaurants.

The coffee making devices as heretofore used, were quite complicated, and did not permit of continuous coffee making with facility, nor enable the convenient keeping hot of the coffee at other times than during rush hours. The present invention is intended to overcome these difficulties, providing a unitary tank in which the complete coffee making outfit will be maintained, thus enabling the coffee to be made in an easy and quick manner with the assurance that the same will be uniform, and making available for other uses much valuable space, heretofore necessary for the accommodation of the coffee making apparatus. It is also an object of the invention to provide means for heating the coffee and maintaining the same hot in a manner best suited to the needs of the restaurant.

With these and other objects in view, my invention is shown in the accompanying drawings, and will be hereinafter more fully described with reference thereto, and finally pointed out in the claims.

In the accompanying drawings,

Figure 1 is a side elevation of my improved coffee making urn,

Fig. 2 is a vertical sectional view thereof,

Fig. 3 is a transverse sectional view,

Fig. 4 is a vertical sectional view with parts broken away, taken on the line 4—4 of Fig. 3, and Fig. 5 is an enlarged detail view of the coffee gage.

Similar reference characters indicate corresponding parts throughout the several figures of the drawings.

Referring to the drawings, my improved urn comprises a lower tank portion 10 adapted to contain water, supplied to the tank by a suitable pipe 11, connecting with the house supply, and controlled by a valve 12. A gas or other similar heater 13 is provided beneath the water tank, inclosed by a perforated closure 14 secured thereto by screws $14^a$, and a safety valve 15 in the form of a whistle is provided at the upper portion of the tank to indicate when the water is boiling. A spigot 16 is provided to permit drawing off of the water.

An upper tank 17 somewhat smaller in diameter than the tank 10 is mounted above the said tank 10, and spaced therefrom by a perforated supporting wall 18, the said wall being secured by screws $17^a$ to a flange $10^a$ on the tank 10, a small auxiliary burner $18^a$ being provided within the said space, the said wall being provided with an opening 19 to permit of the burner being lighted. The purpose of this burner will be hereinafter more fully pointed out.

A cover 20 is provided on the tank 17, and within the tank there is provided a coffee tank 21 spaced from the sides and bottom of the tank 17, and at its upper edge connected to the wall of the tank 17 by a flange 22, substantially removed from the upper edge of the said tank. A central opening 23 is provided in the bottom of the coffee tank, a cylindrical wall 24 being secured to the bottom of the coffee tank at the opening thereof, and to the bottom of the tank 17.

In this way the coffee may be directly heated by the auxiliary burner. A pipe 25 is connected to the cylindrical wall 24, passes in a downwardly inclined direction through the bottom of the tank 17, as shown in Fig. 4, and is provided at its outer end with a spigot 26 for drawing off the coffee. Several such spigots may be provided if desired, which will enable more than one cup of coffee being drawn off at the same time.

The tank 10 is connected at one side by a pipe 27 to the tank 17 below the connecting flange of the coffee tank, and at the other side is connected to the said tank above the connecting flange of the coffee tank by a pipe 28. In this way hot water may be supplied to the space surrounding the coffee tank, and also to the coffee tank. These water supply pipes are controlled by valves 29 and 30 respectively.

The ground coffee is contained in a removable bag 31 supported on the flange 22, so that the water in entering the coffee tank passes through the ground coffee, forming liquid coffee. The water in the space surrounding the coffee tank constitutes a water jacket which serves to keep the coffee hot. A glass gage tube 32 is provided on the tank 17 to determine the amount of water therein, and is provided at its lower end with a small spigot 33 to permit drawing off of the water when desired. Another gage 34 is provided for the coffee tank, being connected thereto by the connecting pipes 35 and 36 passing through the tank 17, and is also provided with a spigot 37. The glass portion 34 of the gage is provided with a series of numerals indicating gallons, and is covered and protected by a copper cylindrical cover 34ª having a series of openings 34ᵇ therein, through which the numerals on the inner glass tube may be seen. Both gages are removable in the usual manner for cleaning.

Should the coffee not be used at the time it is made, it will be kept hot by this hot water jacket, and should this become cool, the auxiliary heater 18ª may be brought into use to heat both the coffee and the water.

In operation the tank 10 is filled with water through pipe 11, which is indicated by the whistle 15, and heated to the boiling point, whereupon the whistle is closed, and by opening the valve 30, the boiling water enters through pipe 28, is caused to percolate or filter through the ground coffee contained in the bag 31, thus extracting its essence. When the gage shows that sufficient coffee is made, then the valve 30 is closed and water admitted to the water jacket through the pipe 27 by opening the valve 29. When the water in the water tank is cool, the coffee may be heated by the auxiliary burner, and the tank 10 is again filled. Fresh coffee may be continuously made in this manner, with the greatest convenience, and the coffee maintained at all times in the proper condition for serving. The coffee and the hot water in the upper and lower tanks may be drained off through their respective spigots, and in this way the tank kept in a clean and sanitary condition.

The tank, may if desired be square or oval, or any other suitable shape, without altering the operative features.

I have illustrated a preferred and satisfactory form of my invention, but it is obvious that changes may be made therein within the spirit and scope thereof, as defined in the appended claims.

I claim:—

1. An apparatus for making coffee and the like, comprising a coffee receptacle having a coffee holder at its upper portion, a water receptacle having its walls spaced from the walls of said coffee receptacle and surrounding the coffee receptacle, the coffee and water receptacles having their bottoms adapted to be simultaneously heated by a burner, and a second water receptacle below the first two receptacles adapted to be heated by another burner, and pipes passing from the interior of the second water receptacle to the interior of the coffee receptacle and the first water receptacle, for conducting heated water to the same to form a heated water jacket between the walls of said coffee receptacle and said first water receptacle and to make the coffee, said three receptacles forming one unitary structure.

2. An apparatus for making coffee or the like, comprising a coffee receptacle having a coffee holder at its upper portion, a water receptacle having its walls spaced from the walls of said coffee receptacle and surrounding the coffee receptacle, a second water receptacle below and spaced from the coffee receptacle and the first water receptacle and adapted to be heated by a burner, a secondary burner disposed at the upper side of said second water receptacle and adapted to simultaneously heat the bottoms of said coffee receptacle and first water receptacle, and pipes passing from the interior of the second water receptacle to the interior of the coffee receptacle and the first water receptacle, for conducting heated water to the same, to form a heated water jacket between the walls of said coffee receptacle and said first water receptacle and to make the coffee, said three receptacles forming one unitary structure.

3. An apparatus for making coffee or the like, comprising a coffee receptacle having a coffee holder at its upper portion and provided at its lower end with a reduced portion, a bottom for said reduced portion extending beyond said reduced portion, and side walls extending upwardly from said bottom in spaced relation to said coffee receptacle and constituting a water jacket therefor, a water receptacle below and in spaced relation to said coffee receptacle and water jacket surrounding the same, adapted to be heated by a burner, a secondary burner disposed at the upper side of said water receptacle and adapted to simultaneously and directly heat said coffee receptacle and said water jacket, and pipes passing from the interior of said water receptacle to the interior of said water jacket and said coffee receptacle, to form a heated water jacket, and to make coffee, said coffee receptacle, water jacket and water receptacle forming one unitary structure.

In testimony that I claim the foregoing as my invention, I have signed my name in presence of two subscribing witnesses.

SOLOMON BARBER.

Witnesses:
D. LEWIS MATTERN,
A. Y. CONGAN.